United States Patent
Freitag et al.

(10) Patent No.: US 6,785,102 B2
(45) Date of Patent: Aug. 31, 2004

(54) SPIN VALVE SENSOR WITH DUAL SELF-PINNED AP PINNED LAYER STRUCTURES

(75) Inventors: James Mac Freitag, San Jose, CA (US); Hardayal Singh Gill, Palo Alto, CA (US); Mustafa Pinarbasi, Morgan Hill, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 210 days.

(21) Appl. No.: 10/125,941

(22) Filed: Apr. 18, 2002

(65) Prior Publication Data

US 2003/0227722 A1 Dec. 11, 2003

(51) Int. Cl.[7] .................................................. G11B 5/39
(52) U.S. Cl. .................................. 360/324.11; 360/314
(58) Field of Search ................................. 360/314, 317, 360/324.1, 324.11, 324.12, 324.2

(56) References Cited

U.S. PATENT DOCUMENTS

| | | | |
|---|---|---|---|
| 5,666,248 A | 9/1997 | Gill | 360/113 |
| 5,768,069 A | 6/1998 | Mauri | 360/113 |
| 5,974,657 A | 11/1999 | Fox et al. | 29/603.08 |
| 6,118,622 A | 9/2000 | Gill | 360/113 |
| 6,122,150 A | 9/2000 | Gill | 360/324.11 |
| 6,191,926 B1 * | 2/2001 | Everitt et al. | 360/324.11 |
| 6,219,208 B1 | 4/2001 | Gill | 360/324.1 |
| 6,222,707 B1 | 4/2001 | Huai et al. | 360/324.1 |
| 6,243,288 B1 * | 6/2001 | Ishikawa et al. | 365/158 |
| 6,252,750 B1 | 6/2001 | Gill | 360/324.11 |
| 6,271,997 B1 | 8/2001 | Gill | 360/314 |
| 6,275,028 B1 | 8/2001 | Matsui et al. | 324/210 |
| 6,317,297 B1 * | 11/2001 | Tong et al. | 360/314 |
| 6,633,461 B2 * | 10/2003 | Gill | 360/314 |
| 6,650,509 B2 * | 11/2003 | Gill | 360/314 |
| 2001/0003022 A1 | 6/2001 | Kakihara | 428/692 |
| 2001/0009063 A1 | 7/2001 | Saito et al. | 29/603.08 |
| 2001/0013999 A1 * | 8/2001 | Koi et al. | 360/324.11 |
| 2001/0014000 A1 | 8/2001 | Tanaka et al. | 360/324.12 |
| 2001/0030887 A1 * | 10/2001 | Ishikawa et al. | 365/158 |
| 2003/0179500 A1 * | 9/2003 | Gill et al. | 360/240 |

FOREIGN PATENT DOCUMENTS

| | | | |
|---|---|---|---|
| JP | 2001-189505 | 7/2001 | H01L/43/12 |
| WO | WO 00/19226 | 4/2000 | G01R/33/09 |
| WO | WO 01/51949 A1 | 7/2001 | G01R/33/09 |

OTHER PUBLICATIONS

*Journal of Applied Physics*, vol. 85, No. 8, Apr. 1999, "PtMn single and dual spin valves with synthetic ferrimagnet pinned layers".
*Journal of Applied Physics*, vol. 89, No. 11, Jun. 2001, "Giant magneto–resistance properties of specular spin valve films in a current perpendicular to plane structure".
*Journal of Applied Physics*, vol. 89, No. 11, Jun. 2001, "Oxygen–enhanced IrMn spin valves deposited by ion–beam and magnetron sputtering".

(List continued on next page.)

*Primary Examiner*—Jefferson Evans
(74) *Attorney, Agent, or Firm*—Ervin F. Johnston

(57) ABSTRACT

A spin valve sensor includes a free layer structure which is located between first and second spacer layers and the first and second spacer layers are located between first and second AP pinned layer structures. Each of the AP pinned layer structures has first and second AP pinned layers with the first AP pinned layer of the first AP pinned layer structure interfacing the first spacer layer and the first AP pinned layer of the second AP pinned layer structure interfacing the second spacer layer. The magnetic thickness of each of the first AP pinned layers is either greater or less than the magnetic thickness of either of the second AP pinned layers of the first and second AP pinned layer structures so that a magnetic field oriented perpendicular to an air bearing surface (ABS) of the sensor sets the magnetic moments of the first and second AP pinned layer structures in-phase so that changes in resistances of the sensor upon rotation of a magnetic moment of the free layer structure is additive.

8 Claims, 8 Drawing Sheets

OTHER PUBLICATIONS

*IEEE Transactions on Magnetics*, vol. 35, No. 2, Mar. 1999, "Spin Valve and Dual Spin Valve Heads with Synthetic Antiferromagnetics".

*IEEE Transactions on Magnetics*, vol. 35, No. 2, Mar. 1999, "Top, Bottom, and Dual Spin Valve Recording Heads with PdPtMn Antiferromagnets".

*Mgt.Res. Sec. Symp Proc.*, vol. 562, 1999, "Structure and Sensor Properties of a Robust GMR Material System".

*IBM Research Disclosure*, No. 432121, p. 747, Apr. 2000, "Dual GMR sensor with larger sheet resistance".

*IBM Research Disclosure*, No. 432134, p. 747, Apr. 2000, "Double dual head with only one AFM".

*IBM Research Disclosure*, No. 432135, p. 753, Apr. 2000, "Dual GMR sensor with canted pinned magnetization".

*IBM Research Disclosure*, No. 432136, p. 753, Apr. 2000, "Dual GMR sensor design with improved stability/biasing".

*IBM Research Disclosure*, No. 434141, p. 1126, Jun. 2000, "Thermally stable dual spin valves".

* cited by examiner (ABS)

1ST MAGNETIC FIELD
(SETS EASY AXES OF
AP PINNED LAYERS)

2ND MAGNETIC FIELD
(ORIENTS MAGNETIC MOMENTS
OF AP PINNED LAYERS)

3RD MAGNETIC FIELD
(LONGITUDINAL SETTING
OF HARD BIAS LAYERS)

SPIN VALVE SENSOR WITH DUAL SELF-PINNED AP PINNED LAYER STRUCTURES

BACKGROUND OF THE INVENTION

1. Field of the Invention

The present invention relates to a spin valve sensor with dual self-pinned AP pinned layer structures wherein magnetic moments of AP pinned layers in the AP pinned layer structures can be oriented in-phase with respect to one another by an exterior magnetic field.

2. Description of the Related Art

The heart of a computer is a magnetic disk drive which includes a rotating magnetic disk, a slider that has write and read heads, a suspension arm above the rotating disk and an actuator arm. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the actuator arm swings the suspension arm to place the write and read heads over selected circular tracks on the rotating disk where field signals are written and read by the write and read heads. The write and read heads are connected to processing circuitry that operates according to a computer program to implement the writing and reading functions.

An exemplary high performance read head employs a spin valve sensor for sensing the magnetic signal fields from the rotating magnetic disk. The sensor includes a nonmagnetic electrically conductive spacer layer sandwiched between a ferromagnetic pinned layer and a ferromagnetic free layer. An antiferromagnetic pinning layer interfaces the pinned layer for pinning the magnetic moment of the pinned layer 90° to an air bearing surface (ABS) wherein the ABS is an exposed surface of the sensor that faces the rotating disk. First and second leads are connected to the spin valve sensor for conducting a sense current therethrough. A magnetic moment of the free layer is free to rotate upwardly and downwardly with respect to the ABS from a quiescent or zero bias point position in response to positive and negative magnetic signal fields from the rotating magnetic disk. The quiescent position of the magnetic moment of the free layer, which is preferably parallel to the ABS, is when the sense current is conducted through the sensor without magnetic field signals from the rotating magnetic disk.

The thickness of the spacer layer is chosen so that shunting of the sense current and a magnetic coupling between the free and pinned layers are minimized. This thickness is typically less than the mean free path of electrons conducted through the sensor. With this arrangement, a portion of the conduction electrons is scattered by the interfaces of the spacer layer with the pinned and free layers. When the magnetic moments of the pinned and free layers are parallel with respect to one another scattering is minimal and when their magnetic moments are antiparallel scattering is maximized. An increase in scattering of conduction electrons increases the resistance of the spin valve sensor and a decrease in scattering of the conduction electrons decreases the resistance of the spin valve sensor. Changes in resistance of the spin valve sensor is a function of $\cos\theta$, where $\theta$ is the angle between the magnetic moments of the pinned and free layers. When a sense current is conducted through the spin valve sensor, resistance changes cause potential changes that are detected and processed as playback signals.

The sensitivity of the spin valve sensor is quantified as magnetoresistance or magnetoresistive coefficient dr/R where dr is the change in resistance of the spin valve sensor from minimum resistance (magnetic moments of free and pinned layers parallel) to maximum resistance (magnetic moments of the free and pinned layers antiparallel) and R is the resistance of the spin valve sensor at minimum resistance. Because of the high magnetoresistance of a spin valve sensor it is sometimes referred to as a giant magnetoresistive (GMR) sensor.

A dual spin valve sensor may be employed for increasing the magnetoresistive coefficient dr/R of a read head. In a dual spin valve sensor first and second pinned layer structures are employed with a first spacer layer between the first pinned layer structure and the free layer and a second spacer layer between the second pinned structure and the free layer. With this arrangement the spin valve effect is additive on each side of the free layer to increase the magnetoresistive coefficient dr/R of the read head. In order to reduce demagnetizing fields $H_D$ from the first and second pinned layers on the free layer, each of the pinned layers may be an antiparallel (AP) pinned layer structure. The first AP pinned layer structure has an antiparallel coupling (APC) layer which is located between ferromagnetic first and second AP pinned layers (AP1) and (AP2) and the second AP pinned layer structure has another antiparallel coupling layer which is located between another first and second AP pinned layers (AP1) and (AP2). The AP pinned layers of each AP pinned layer structure have magnetic moments which are antiparallel with respect to one another because of a strong antiferromagnetic coupling therebetween. The AP pinned layer structure is fully described in commonly assigned U.S. Pat. No. 5,465,185 which is incorporated by reference herein. Because of the partial flux closure between the AP pinned layers of each first and second AP pinned layer structures, each AP pinned layer structure exerts a small demagnetizing field on the free layer.

In a dual spin valve sensor, where the pinned layer structures are AP pinned layer structures, the first AP pinned layer of the first AP pinned layer structure interfaces the first spacer layer and the first AP pinned layer of the second AP pinned layer structure interfaces the second spacer layer. In order for the aforementioned spin valve effect to be additive on each side of the free layer it is important that the AP pinned layer structures be in-phase with respect to one another. This occurs when the magnetic moments of the first AP pinned layers of the first and second AP pinned layer structures are oriented perpendicular to the ABS and parallel with respect to one another. Accordingly, when a signal field from a rotating magnetic disk rotates the free layer structure the change in resistance of the sensor due to the magnetoresistive coefficient will be additive to increase the signal output of the read head.

SUMMARY OF THE INVENTION

The present invention provides a spin valve sensor with dual self-pinned AP pinned layer structures wherein magnetic moments of the AP pinned layers within the AP pinned layer structures can be set in-phase by an exterior magnetic field. In one embodiment of the invention this is accomplished by providing each of the first AP pinned layers of the first and second AP pinned layer structures with a magnetic thickness which is greater than the magnetic thickness of either of the second AP pinned layers of the first and second AP pinned layer structures. In another embodiment of the invention this is accomplished by providing each of the first AP pinned layers of the first and second AP pinned layer structures with a magnetic thickness which is less than the magnetic thickness of either of the second AP pinned layers of the first and second AP pinned layer structures. In either embodiment an exterior magnetic field, which is oriented perpendicular to the ABS, will set the magnetic moments of the thicker AP pinned layers in the same direction which will cause the magnetic moments of the thinner AP pinned layers to be oriented antiparallel thereto. Previously, the orientation of the magnetic moments of the AP pinned layers of the first and second AP pinned layer structures were determined by the orientations of magnetic spins of first and second pining layers which were exchange coupled to the first and second AP pinned layer structures respectively.

Another aspect of the invention is to provide a seed layer structure wherein a bottom portion of the seed layer structure is sputter etched before depositing a top platinum manganese (PtMn) layer of the seed layer structure thereon. Still another aspect of the invention provides a method wherein: (1) the easy axes of the AP pinned layers of the first and second AP pinned layer structures are set perpendicular to the ABS by a first magnetic field; (2) orienting the magnetic moments of the AP pinned layers in-phase and perpendicular to the ABS, as discussed hereinabove, by a second magnetic field; and (3) longitudinally setting the magnetic moments of first and second hard bias layers which longitudinally bias the free layer structure, by a third magnetic field oriented parallel to the ABS and parallel to major planes of the AP pinned layers.

An object of the present invention is to provide a spin valve sensor with dual self-pinned AP pinned layer structures wherein magnetic moments of AP pinned layers within the AP pinned layer structures can be set in-phase by an exterior magnetic field.

Another object is to provide the aforementioned spin valve sensor wherein the self-pinning of the dual AP pinned layer structures is improved.

A further object is to provide a method of making the aforementioned spin valve sensor.

Other objects and attendant advantages of the invention will be appreciated upon reading the following description taken together with the accompanying drawings.

DESCRIPTION OF THE PREFERRED EMBODIMENTS

Magnetic Disk Drive

Figure 1:
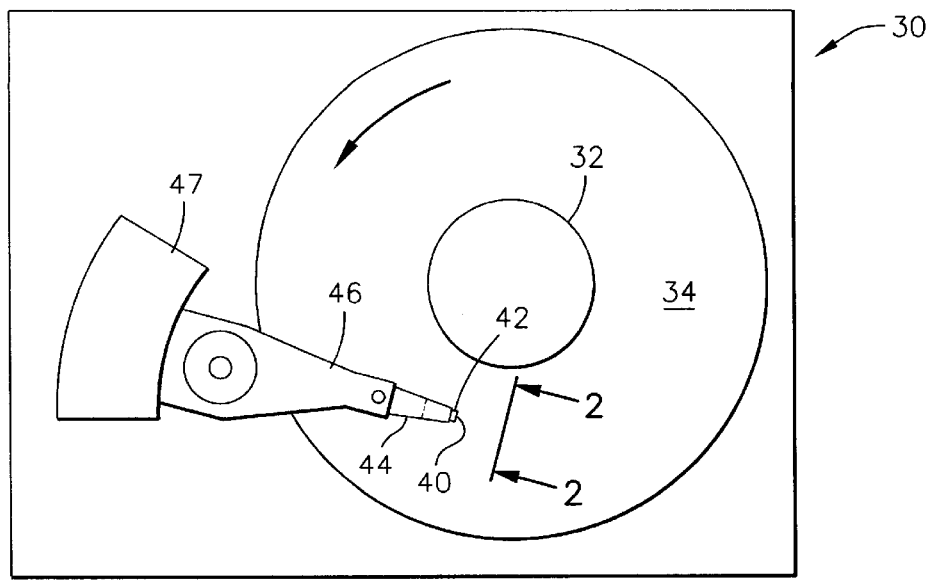
FIG. 1 is a plan view of an exemplary magnetic disk drive.
Figure 2:
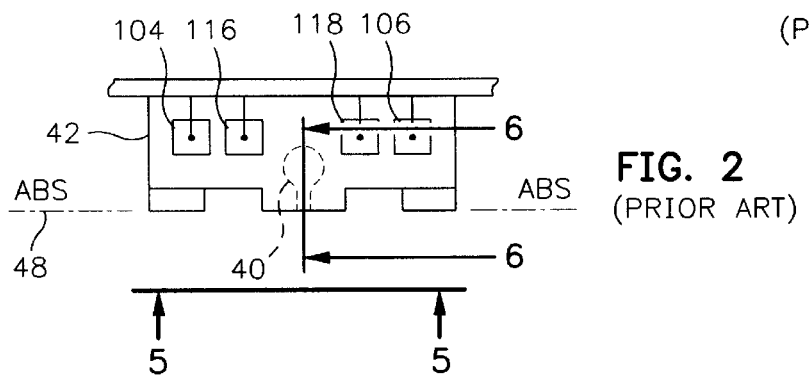
FIG. 2 is an end view of a slider with a magnetic head of the disk drive as seen in plane 2—2 of FIG. 1.
Figure 3:
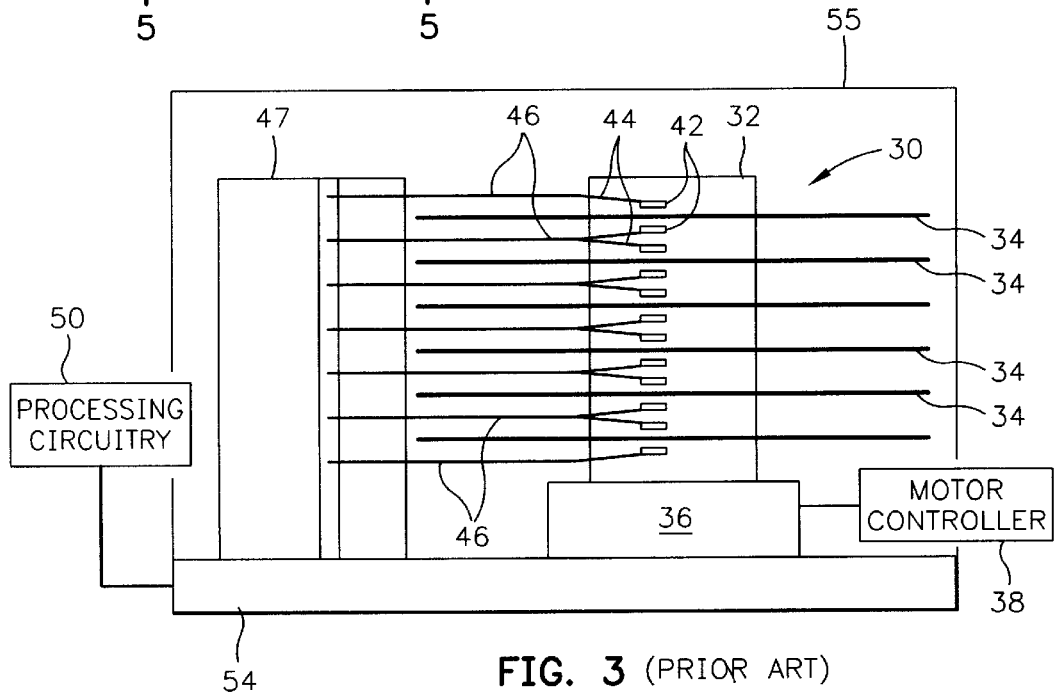
FIG. 3 is an elevation view of the magnetic disk drive wherein multiple disks and magnetic heads are employed.
Figure 4:
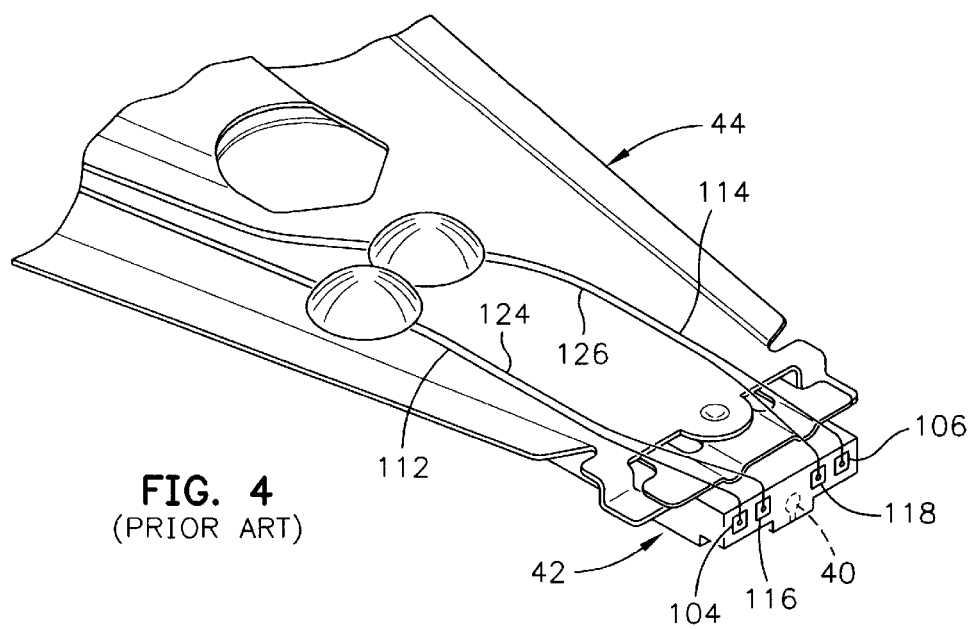
FIG. 4 is an isometric illustration of an exemplary suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a spindle motor 36 that is controlled by a motor controller 38. A slider 42 has a combined read and write magnetic head 40 and is supported by a suspension 44 and actuator arm 46 that is rotatably positioned by an actuator 47. A plurality of disks, sliders and suspensions may be employed in a large capacity direct access storage device (DASD) as shown in FIG. 3. The suspension 44 and actuator arm 46 are moved by the actuator 47 to position the slider 42 so that the magnetic head 40 is in a transducing relationship with a surface of the magnetic disk 34. When the disk 34 is rotated by the spindle motor 36 the slider is supported on a thin (typically, 0.01 μm) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides spindle motor drive signals for rotating the magnetic disk 34, and provides control signals to the actuator for moving the slider to various tracks. In FIG. 4 the slider 42 is shown mounted to a suspension 44. The components described hereinabove may be mounted on a frame 54 of a housing 55, as shown in FIG. 3.

Figure 5:
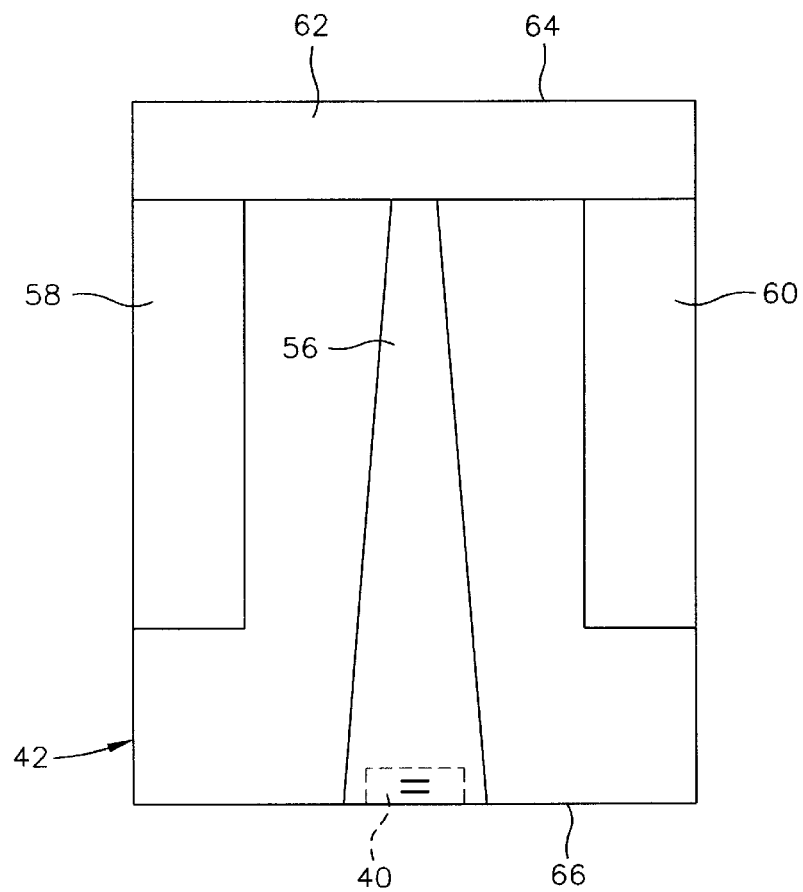
FIG. 5 is an ABS view of the magnetic head taken along plane 5—5 of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figure 6:
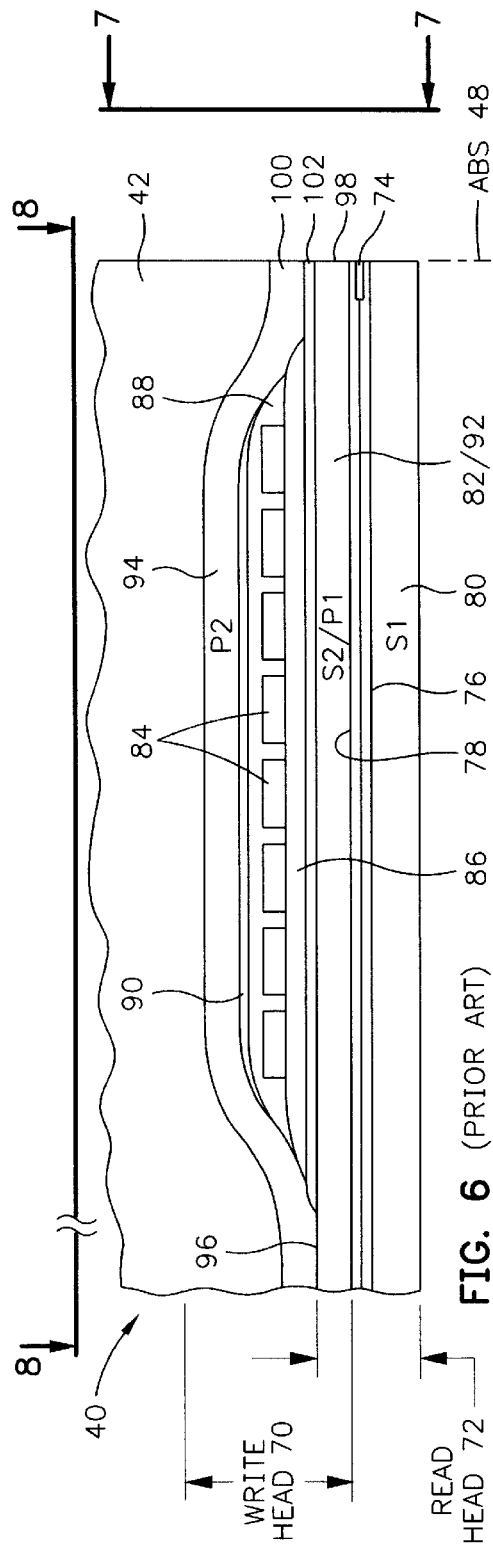
FIG. 6 is a partial view of the slider and a merged magnetic head as seen in plane 6—6 of FIG. 2.
Figure 7:
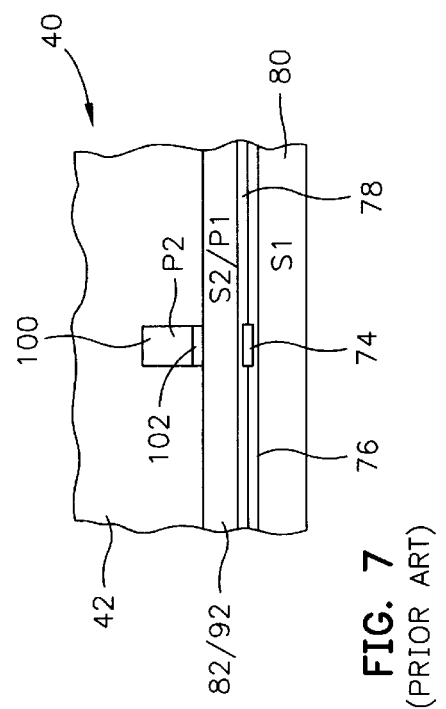
FIG. 7 is a partial ABS view of the slider taken along plane 7—7 of FIG. 6 to show the read and write elements of the magnetic head.

FIG. 6 is a side cross-sectional elevation view of a merged magnetic head 40, which includes a write head portion 70 and a read head portion 72, the read head portion employing a spin valve sensor 74 of the present invention. FIG. 7 is an ABS view of FIG. 6. The spin valve sensor 74 is sandwiched between nonmagnetic electrically insulative first and second read gap layers 76 and 78, and the read gap layers are sandwiched between ferromagnetic first and second shield layers 80 and 82. In response to external magnetic fields, the resistance of the spin valve sensor 74 changes. A sense current $I_S$ conducted through the sensor causes these resistance changes to be manifested as potential changes. These potential changes are then processed as readback signals by the processing circuitry 50 shown in FIG. 3.

Figure 8:
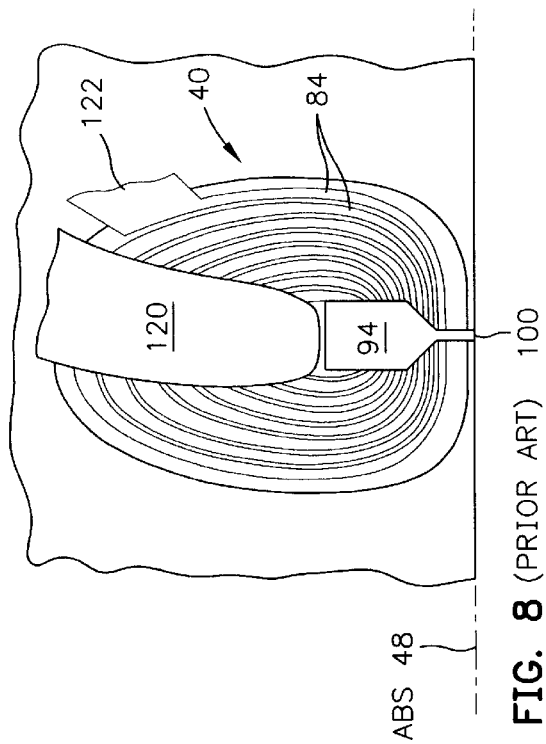
FIG. 8 is a view taken along plane 8—8 of FIG. 6 with all material above the coil layer and leads removed.

The write head portion 70 of the magnetic head 40 includes a coil layer 84 which is sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. Since the second shield layer 82 and the first pole piece layer 92 are a common layer this head is known as a merged head. In a piggyback head (not shown) the layers 82 and 92 are separate layers and are separated by an insulation layer. As shown in FIGS. 2 and 4, first and second solder connections 104 and 106 connect leads from the spin valve sensor 74 to leads 112 and 114 on the suspension 44, and third and fourth solder connections 116 and 118 connect leads 120 and 122 from the coil 84 (see FIG. 8) to leads 124 and 126 on the suspension.

Figure 9:
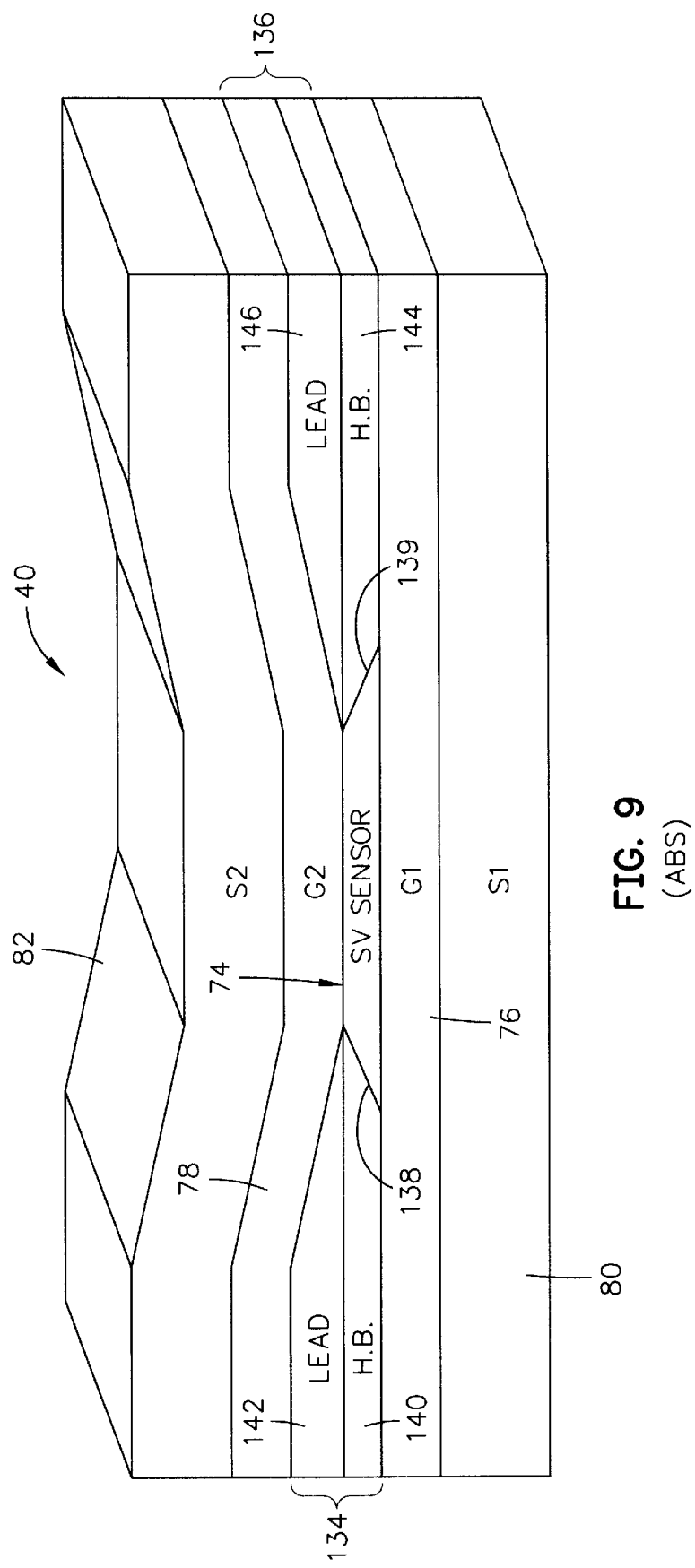
FIG. 9 is an enlarged isometric ABS illustration of a read head which has a spin valve sensor.

FIG. 9 is an isometric ABS illustration of the read head 40 shown in FIG. 7. The read head 40 includes the spin valve sensor 74. First and second hard bias and lead layers 134 and 136 are connected to first and second side edges 138 and 139 of the spin valve sensor. This connection is known in the art as a contiguous junction and is fully described in commonly assigned U.S. Pat. No. 5,018,037. The first hard bias and lead layers 134 include a first hard bias layer 140 and a first lead layer 142 and the second hard bias and lead layers 136 include a second hard bias layer 144 and a second lead layer 146. The hard bias layers 140 and 144 cause magnetic fields to extend longitudinally through the spin valve sensor 74 for stabilizing the magnetic domains therein. The spin valve sensor 74 and the first and second hard bias and lead layers 134 and 136 are located between the nonmagnetic electrically insulative first and second read gap layers 76 and 78 and the first and second read gap layers 76 and 78 are, in turn, located between the ferromagnetic first and second shield layers 80 and 82.

The Invention

Figure 10:
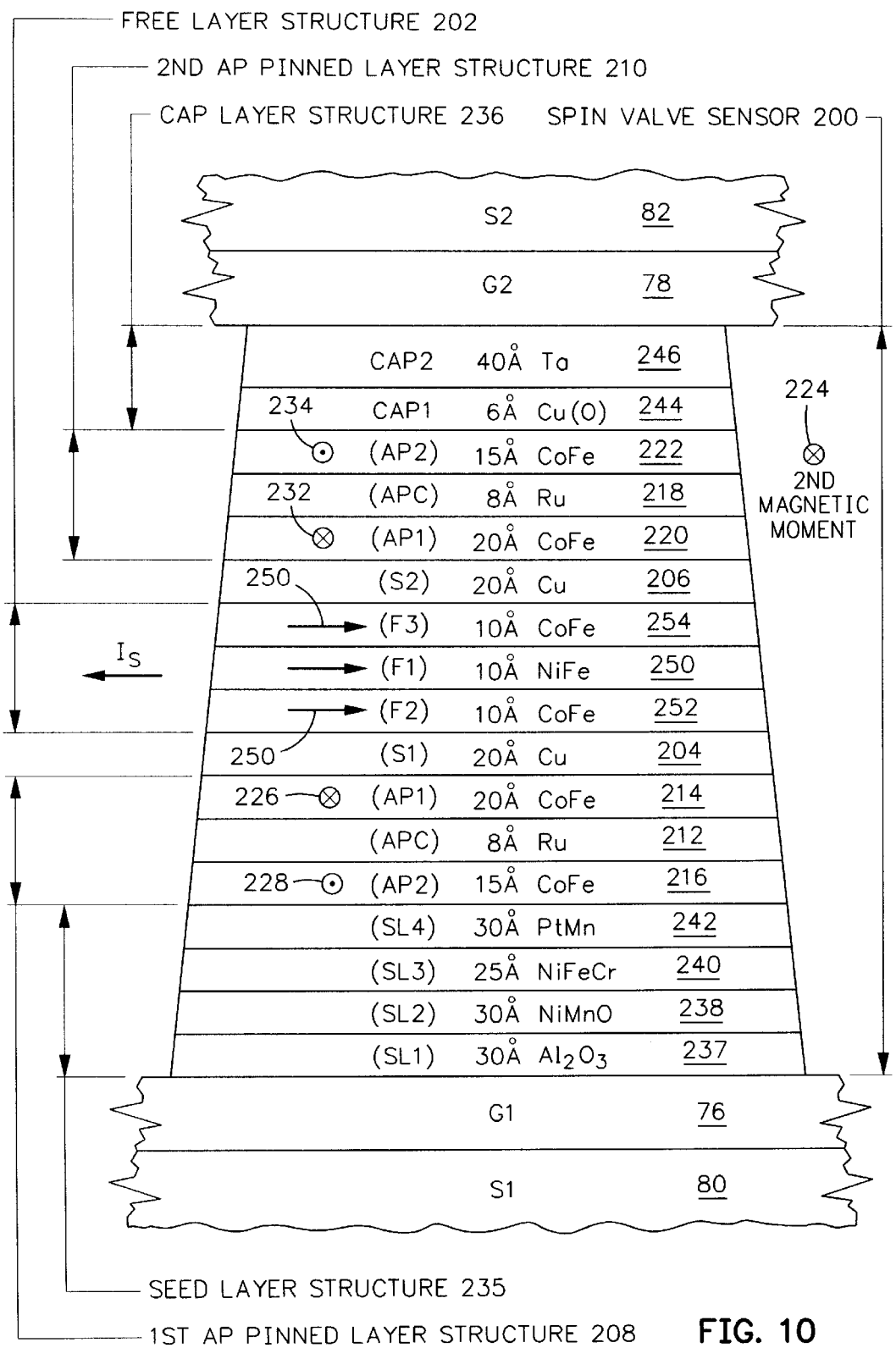
FIG. 10 is an ABS illustration of one embodiment of the present invention.

FIG. 10 is an ABS illustration of a first embodiment of the present dual AP pinned spin valve sensor 200. In this embodiment a free layer structure 202 is located between nonmagnetic conductive first and second spacer layers 204 and 206. The first and second spacer layers 204 and 206 are, in turn, located between first and second AP pinned layer structures 208 and 210. The first AP pinned layer structure 208 includes an antiparallel coupling (APC) layer 212 which is located between ferromagnetic first and second AP pinned layers (AP1) and (AP2) 214 and 216. The second AP pinned layer structure 210 includes an antiparallel coupling (APC) layer 218 which is located between ferromagnetic first and second AP pinned layers (AP1) and (AP2) 220 and 222.

The first and second AP pinned layers 214 and 216 of the first AP pinned layer structure have magnetic moments 226 and 228 respectively and the AP pinned layers 220 and 222 of the second AP pinned layer structure have magnetic moments 232 and 234 which can be set in-phase with respect to one another by a second magnetic field 224 applied from a source exterior of the sensor which will be explained in more detail hereinafter. The free layer structure 202, the first and second spacer layers 204 and 206 and the first and second AP pinned layer structures 208 and 210 are located between a seed layer structure 235 and a cap layer structure 236. The seed layer structure 235 preferably includes a first seed layer (SL1) 237 on the first gap layer 76, a second seed layer (SL2) 238 on the first seed layer 237, a third seed layer (SL3) 240 on the second seed layer 238 and a fourth seed layer (SL4) 242 on the third seed layer 240. It has been found that this seed layer structure with the materials and thicknesses shown improves the texture of the layers deposited thereon. The cap layer structure 236 preferably includes a first cap layer (CAP1) 244 on the second AP pinned layer structure 210 and a second cap layer (CAP2) 246 on the first cap layer 244. It has been found that the materials and thicknesses of the cap layers improve the magnetoresistive coefficient of the spin valve sensor.

The spin valve sensor 200 is located between the first and second gap layers 76 and 78 and the first and second gap layers are located between the first and second shield layers 80 and 82. The read gap, which determines the linear read bit density of the read head, is the distance between the first and second shield layers 80 and 82. The read gap has been significantly decreased by omitting first and second pinning layers for pinning the magnetic moments of the first and second AP pinned layer structures 208 and 210. These pinning layers are typically 120 Å each which means that the gap thickness has been decreased by 240 Å by eliminating the pinning layers. Materials for the AP pinned layers 214, 216, 220 and 222 for improving the self-pinning of the AP pinned layer structures is discussed hereinbelow.

As stated hereinabove, the magnetic moments of the AP pinned layers can be set by the second magnetic moment 224 which is applied exteriorly to the spin valve sensor. In the embodiment shown in FIG. 10 the magnetic thicknesses of each of the first AP pinned layers 214 and 220 is greater than the magnetic thickness of either of the second AP pinned layers 216 and 222. Accordingly, when the second magnetic field 224 is applied exterior to the sensor into the sensor it will cause the magnetic moments 226 and 232 of the first AP pinned layers to be oriented perpendicular to the ABS and into the sensor. Because of the strong antiparallel coupling in the first and second AP pinned layer structures 208 and 210 this will cause the magnetic moments 228 and 234 of the second AP pinned layers to be oriented antiparallel to the magnetic moments 226 and 232 of the first AP pinned layers when the magnetic field is removed. Optionally, the second magnetic field 224 may be directed out of the sensor which would cause the directions of the magnetic moments 226, 232, 228 and 234 to be reversed in their directions.

The free layer structure 202 preferably includes a first free layer (F1) 250 which is located between second and third free layers (F2) 252 and (F3) 254. The free layer structure 202 has a magnetic moment 250 which is oriented parallel to the ABS and parallel to the major planes of the AP pinned layers in a direction from either right to left, as shown in FIG. 10, or from left to right. When a signal field from the rotating magnetic disk rotates the magnetic moment 250 of the free layer structure into the sensor the magnetic moment 250 becomes more parallel with respect to the magnetic moments 226 and 232, which decreases the resistance of the sensor to a sense current $I_S$, and when a signal field rotates the magnetic moment 250 of the free layer structure out of the sensor the magnetic moment 250 becomes more antiparallel with respect to the magnetic moments 226 and 232 which increases the resistance of the sensor. These resistance changes of the sensor are processed as playback signals by the processing circuitry 50 shown in FIG. 3. It should be noted that the processing circuitry 50 in FIG. 3 supplies the sense current $I_S$ to the sensor.

Assuming that the material for the AP pinned layers is $Co_{90}Fe_{10}$, exemplary thicknesses to accomplish the aforementioned objectives is to make each of the first AP pinned layers 214 and 220 of 20 Å of $Co_{90}Fe_{10}$ and make each of the second AP pinned layers 216 and 222 of 15 Å of $Co_{90}Fe_{10}$.

Regardless of the materials employed for the AP pinned layers, it should be understood that the magnetic thicknesses of the first AP pinned layers 214 and 220 should be either greater or less than either of the magnetic thicknesses of the second AP pinned layers 216 and 222. Exemplary thicknesses and materials for the remaining layers are 30 Å of $Al_2O_3$ for the first seed layer 237, 30 Å of NiMnO for the second seed layer 238, 25 Å of NiFeCr for the third seed layer 240, 30 Å of PtMn for the fourth seed layer 242, 20 Å of Cu for the first spacer layer 204, 10 Å of CoFe for the second free layer 252, 10 Å of NiFe for the first free layer 250, 10 Å of CoFe for the third free layer 254, 20 Å of Cu for the second spacer layer 206, 6 Å of CuO for the first cap layer 244 and 40 Å of Ta for the second cap layer 246. It should be noted that the thickness of the fourth seed layer 242 is significantly below the typical 150 Å of PtMn which is required for platinum manganese to be a pining layer. The platinum manganese has been found to be desirable for a top seed layer. The first seed layer 237 may be omitted if the first gap layer 76 is $Al_2O_3$.

Figure 11:
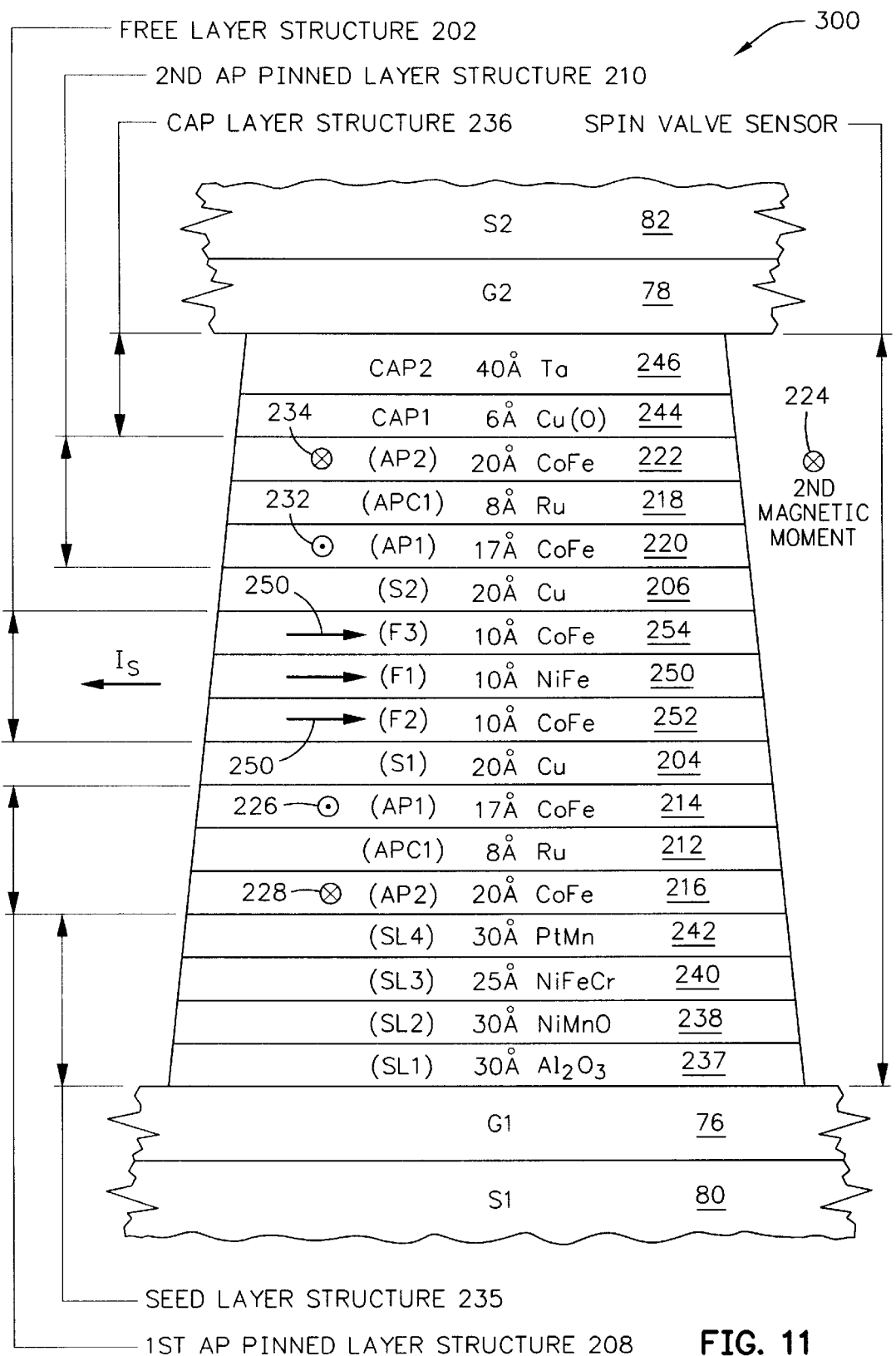
FIG. 11 is an ABS illustration of another embodiment of the present invention.

Another embodiment of the present spin valve sensor is shown in FIG. 11 which is the same as the spin valve sensor shown in FIG. 10 except each of the first AP pinned layers 214 and 220 has a magnetic thickness which is less than either of the magnetic thicknesses of the second AP pinned layers 216 and 222. Exemplary thicknesses when the material is $Co_{90}Fe_{10}$ is 17 Å of $Co_{90}Fe_{10}$ for each of the first AP pinned layers 214 and 220 and 20 Å of $Co_{90}Fe_{10}$ for each of the second AP pinned layers 216 and 222. Accordingly, when the second magnetic field 224 is exteriorly applied into the sensor the magnetic moments 228 and 234 of the second AP pinned layers are oriented perpendicular to and into the sensor which causes the magnetic moments 226 and 232 of the first AP pinned layers to be oriented antiparallel thereto. Optionally, the second magnetic field 224 may be directed out of the sensor which would reverse the orientations of the magnetic moments of the AP pinned layers. The magnetic thicknesses of each of the first or second AP pinned layers must be greater than the magnetic thicknesses of the second or first AP pinned layers respectively so that the second magnetic field 224 sets the magnetic moments in-phase.

Figure 12:
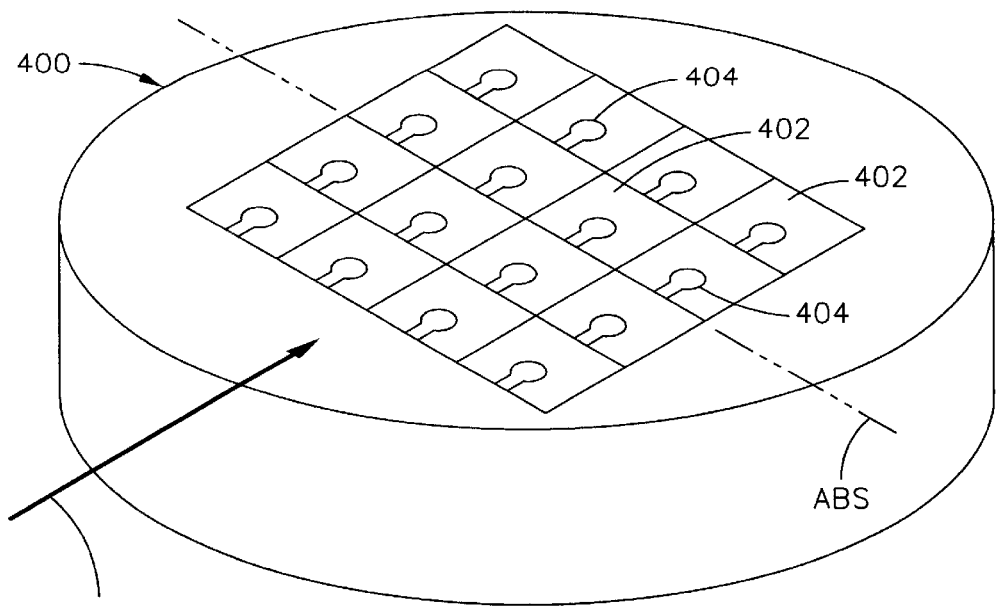
FIG. 12 is an isometric illustration of a wafer with rows and columns of sliders with magnetic heads formed thereon and subjected to a first magnetic field for setting easy axes of AP pinned layers.
Figure 13:
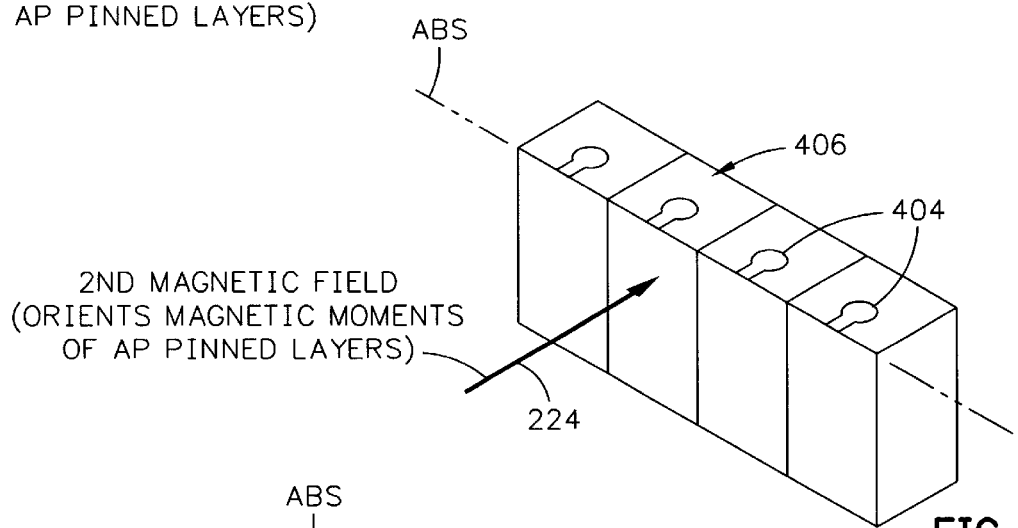
FIG. 13 is an isometric illustration of a row of sliders with magnetic heads wherein a second magnetic field orients magnetic moments of the AP pinned layers in-phase with respect to one another.
Figure 14:
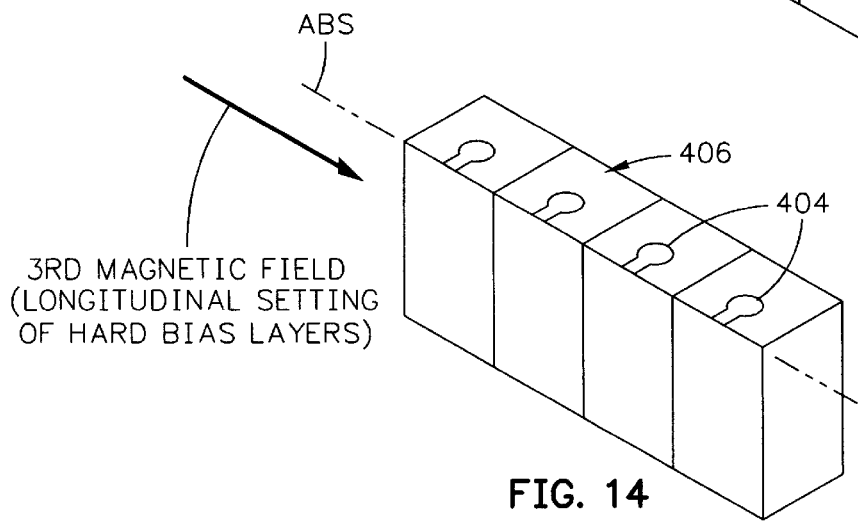
FIG. 14 is the same as FIG. 13 except a third magnetic field is applied for setting the magnetic moments of hard biasing layers which stabilize free layers within the magnetic heads.
Figure 15:
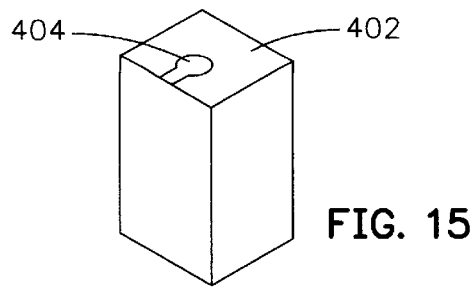
FIG. 15 is an isometric illustration of a single slider and magnetic head after dicing it from the row of magnetic heads in FIG. 14.

FIGS. 12–14 illustrate exemplary methods for setting the magnetic moments of the read heads. In FIG. 12 a wafer 400 is illustrated wherein rows and columns of sliders 402 with magnetic heads 404 has been formed thereon. During formation of the aforementioned AP pinned layers of the AP pinned layer structures a first magnetic field is oriented perpendicular to the air bearing surfaces for setting the easy axes of the AP pinned layers perpendicular to the air bearing surfaces which first magnetic field is preferably applied in the presence of heat, such as 265° C. The strength of the first magnetic field in FIG. 12 may be on the order of 10 kOe. FIG. 13 illustrates a row of sliders and magnetic heads after dicing the row from the rows and columns of sliders and magnetic heads in FIG. 12. In FIG. 13 the row of sliders and magnetic heads 406 is subjected to the aforementioned second magnetic field which orients the magnetic moments of the AP pinned layers of the first and second AP pinned layer structures so that the AP pinned layer structures are in-phase with respect to one another. The strength of the second magnetic field in FIG. 13 may be on the order of 10 kOe. In FIG. 14 the row of sliders and magnetic heads is longitudinally set which means that a third magnetic field is oriented parallel to the air bearing surfaces and parallel to the major planes of the AP pinned layers. The strength of the third magnetic field may be 2–5 Oe. The longitudinal setting sets the magnetic moments of the first and second hard bias layers 140 and 144 in FIG. 9 in a direction parallel to the ABS and parallel to the major planes of the AP pinned layers for longitudinally biasing and magnetically stabilizing the free layer structure within the sensor. It should be understood that the steps shown in FIGS. 13 and 14 may optionally be accomplished at the wafer level, as shown in FIG. 12, or at the slider level 402, as shown in FIG. 15.

Figure 16:
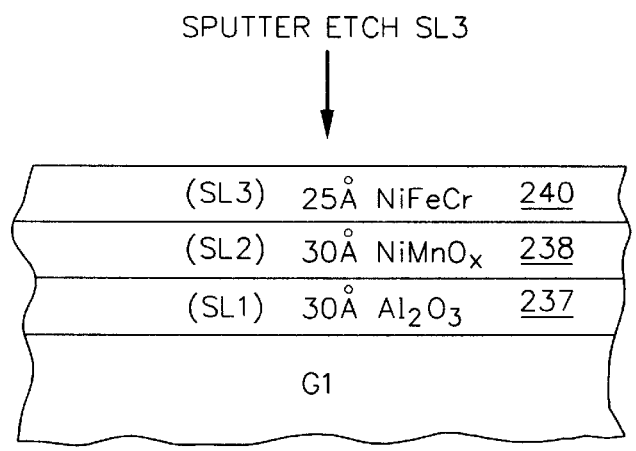
FIG. 16 is a schematic illustration of sputter etching a third seed layer.
Figure 17:
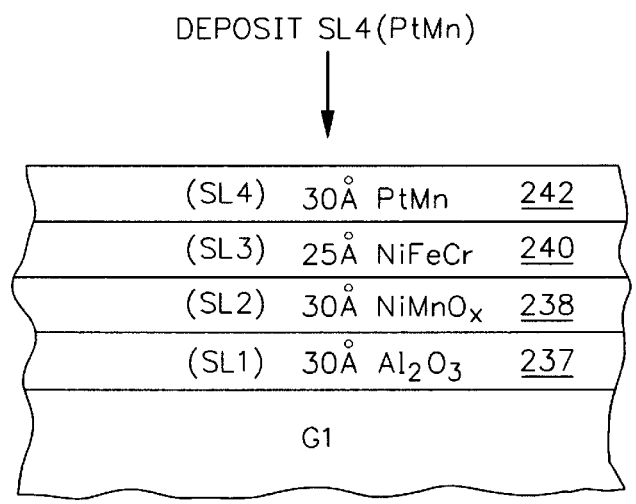
FIG. 17 is the same as FIG. 16 except a fourth seed layer of platinum manganese (PtMn) has been deposited on the third seed layer.

FIG. 16 shows sputter etching of the third seed layer 240 after its formation on the second and first seed layers 238 and 237. FIG. 17 shows the sputter deposition of the fourth seed layer 242 of platinum manganese (PtMn) on the third seed layer 240 after the sputter etch, as shown in FIG. 16. It has been found that this method of fabrication of the seed layer structure results in an improved texture of the layers deposited thereon.

Discussion

It should be understood that one or both of the AP pinned layer structures 208 and 210 may be a triple or even higher AP pinned layer structure in lieu of the dual AP pinned layer structures as shown in FIGS. 10 and 11. For instance, if each of the AP pinned layer structures 208 and 210 is a triple AP pinned layer structure each of the AP pinned layer structures would have a third AP pinned layer which is separated from the second AP pinned layer by another antiparallel coupling layer. In a triple AP pinned layer structure the second AP pinned layer would be antiparallel to the first and third AP pinned layers. Again, the thicker AP pinned layers will control the orientation of the magnetic moments of the AP pinned layers.

It should also be understood that the method of the invention may be practiced with a single self-pinned AP pinned layer structure instead of a dual self-pinned AP pinned layer structure. In a single self-pinned AP pinned layer structure the layers 254, 206, 220, 218 and 222 would be omitted in either of FIGS. 10 and 11.

It should further be understood that other seed layer structures may be employed in lieu of the seed layer structure 235 and other cap layer structures may be employed in lieu of the cap layer structure 236 without departing from various aspects of the present invention. Further, the free layer structure may be a single layer of NiFe, however, it has been found that when the second and third free layers 252 and 254 are CoFe the magnetoresistive coefficient dr/R of the sensor is increased. It should also be understood that the thicknesses of the magnetic layers are to be considered as magnetic thicknesses. For instance, other materials can be employed for the ferromagnetic layers so long as the magnetic thicknesses have the relationships discussed hereinabove. When the first gap layer (G1) is aluminum oxide ($Al_2O_3$) the first seed layer (SL1) 237 may be omitted. Further, the slider supporting the magnetoresistive sensor may have a head surface other than the aforementioned ABS, such as a tape surface for use in a tape drive.

The following commonly assigned U.S. Patents are incorporated in their entirety by reference herein: (1) U.S. Pat. No. 5,465,185; (2) U.S. Pat. No. 5,583,725; (3) U.S. Pat. No. 5,768,069; (4) U.S. Pat. No. 6,040,961; (5) U.S. Pat. No. 6,117,569; (6) U.S. Pat. No. 6,127,053; and (7) U.S. Pat. No. 6,219,211 B1.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

We claim:

1. A magnetic head assembly, which has a head surface for facing a magnetic medium, comprising:
   ferromagnetic first and second shield layers;
   nonmagnetic and insulative first and second read gap layers located between the first and second shield layers;
   a spin valve sensor located between the first and second read gap layers;
   the spin valve sensor including:
      first and second antiparallel (AP) pinned layer structures wherein each AP pinned layer structure is self pinned without the assistance of a pinning layer;
      each of the first and second AP pinned layer structures having at least first and second antiparallel (AP) pinned layers and at least one antiparallel (AP) coupling layer with the AP coupling layer being located between the first and second AP pinned layers;
      a free layer structure that has a magnetic moment that is oriented parallel to the head surface and parallel to major planes of the AP pinned layers;
      a nonmagnetic electrically conductive first spacer layer located between the first AP pinned layer structure and the free layer structure and a nonmagnetic electrically conductive second spacer layer located between the second AP pinned layer structure and the free layer structure;
      the first AP pinned layer of the first AP pinned layer structure interfacing the first spacer layer and the first AP pinned layer of the second AP pinned layer structure interfacing the second spacer layer;
      each of the first and second AP pinned layers having a magnetic moment that is oriented perpendicular to the head surface;
      the magnetic moments of the first AP pinned layers of the first and second AP pinned layer structures being parallel with respect to one another and in a same direction, the magnetic moments of second AP pinned layers of the first and second AP pinned layer structures being parallel with respect to one another and in a same direction and the magnetic moments of the first AP pinned layers being antiparallel to the magnetic moments of the second AP pinned layers; and
      each of the first AP pinned layers of the first and second AP pinned layer structures having a magnetic thickness that is greater than a magnetic thickness of each of the second AP pinned layers of the first and second AP pinned layer structures.

2. A magnetic head assembly as claimed in claim 1 further comprising:
   a write head including:
      ferromagnetic first and second pole piece layers which each have a yoke portion located between a pole tip portion and a back gap portion;
      a nonmagnetic write gap layer located between the pole tip portions of the first and second pole piece layers;
      an insulation stack with at least one coil layer embedded therein located between the yoke portions of the first and second pole piece layers; and
      the first and second pole piece layers being connected at their back gap portions.

3. A magnetic head assembly, which has a head surface for facing a magnetic medium, comprising:
   a read head including:
      ferromagnetic first and second shield layers;
      nonmagnetic and insulative first and second read gap layers located between the first and second shield layers; and
      a spin valve sensor being located between the first and second read gap layers; the spin valve sensor including:
         first and second antiparallel (AP) pinned layer structures wherein each AP pinned layer structure is self pinned without the assistance of a pinning layer;
         each of the first and second AP pinned layer structures having at least first and second antiparallel (AP) pinned layers and at least one antiparallel (AP) coupling layer with the NP coupling layer being located between the first and second AP pinned layers; a free layer structure that has a magnetic moment that is oriented parallel to the head surface and parallel to major planes of the NP pinned layers;
         a nonmagnetic electrically conductive first spacer layer located between the first AP pinned layer structure and the free layer structure and a nonmagnetic electrically conductive second spacer layer located between the second NP pinned layer structure and the free layer structure;
         the first NP pinned layer of the first NP pinned layer structure interfacing the first spacer layer and the first NP pinned layer of the second NP pinned layer structure interfacing the second spacer layer;
         each of the first and second NP pinned layers having a magnetic moment that is oriented perpendicular to the head surface;
         the magnetic moments of the first NP pinned layers of the first and second NP pinned layer structures being parallel with respect to one another and in a same direction, the magnetic moments of second NP pinned layers of the first and second NP pinned layer structures being parallel with respect to one another and in a same direction and the magnetic moments of the first NP pinned layers being antiparallel to the magnetic moments of the second NP pinned layers; and
         each of the first NP pinned layers of the first and second NP pinned layer structures having a magnetic thickness that is greater than a magnetic thickness of each of the second NP pinned layers of the first and second NP pinned layer structures;
   a write head including:
      ferromagnetic first and second pole piece layers which each have a yoke portion located between a pole tip portion and a back gap portion;
      a nonmagnetic write gap layer located between the pole tip portions of the first and second pole piece layers;

an insulation stack with at least one coil layer embedded therein located between the yoke portions of the first and second pole piece layers; and
the first and second pole piece layers being connected at their back gap portions.

4. A magnetic disk drive, that has a head surface for facing a magnetic medium and that has at least one magnetic head assembly that includes a write head and a read head, comprising:

the write head including:
ferromagnetic first and second pole piece layers that each have a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers; and
the first and second pole piece layers being connected at their back gap portions; and the read head including:
nonmagnetic nonconductive first and second read gap layers;
a dual spin valve sensor located between the first and second read gap layers;
ferromagnetic first and second shield layers; and
the first and second read gap layers being located between the first and second shield layers with the first read gap layer interfacing the first shield layer and the second read gap layer interfacing the second shield layer;

the dual spin valve sensor including:
first and second antiparallel (AP) pinned layer structures wherein each AP pinned layer structure is self pinned without the assistance of a pinning layer;
each of the first and second AP pinned layer structures having at least first and second antiparallel (AP) pinned layers and at least one antiparallel (AP) coupling layer with the AP coupling layer being located between the first and second AP pinned layers;
a free layer structure that has a magnetic moment that is oriented parallel to the head surface and parallel to major planes of the AP pinned layers;
a nonmagnetic electrically conductive first spacer layer located between the first AP pinned layer structure and the free layer structure and a nonmagnetic electrically conductive second spacer layer located between the second AP pinned layer structure and the free layer structure;
the first AP pinned layer of the first AP pinned layer structure interfacing the first spacer layer and the first AP pinned layer of the second AP pinned layer structure interfacing the second spacer layer;
each of the first and second AP pinned layers having a magnetic moment that is oriented perpendicular to the head surface;
the magnetic moments of the first AP pinned layers of the first and second AP pinned layer structures being parallel with respect to one another and in a same direction, the magnetic moments of second AP pinned layers of the first and second AP pinned layer structures being parallel with respect to one another and in a same direction and the magnetic moments of the first AP pinned layers being antiparallel to the magnetic moments of the second AP pinned layers; and each of the first AP pinned layers of the first and second AP pinned layer structures having a magnetic thickness that is greater than a magnetic thickness of each of the second AP pinned layers of the first and second AP pinned layer structures;

a housing; the magnetic medium being supported in the housing;
a support mounted in the housing for supporting the magnetic head assembly with said head surface facing the magnetic medium so that the magnetic head assembly is in a transducing relationship with the magnetic medium;
a motor for moving the magnetic medium; and
a processor connected to the magnetic head assembly and to the motor for exchanging signals with the magnetic head assembly and for controlling movement of the magnetic medium.

5. A method of making a magnetic head assembly, that has a head surface for facing a magnetic medium, comprising the steps of:

forming ferromagnetic first and second shield layers with nonmagnetic and insulative first and second read gap layers located between the first and second shield layers;
forming a spin valve sensor between the first and second read gap layers;
a method of making the spin valve sensor including the steps of:
forming first and second antiparallel (AP) pinned layer structures wherein each AP pinned layer structure is self pinned without the assistance of a pinning layer;
forming each of the first and second AP pinned layer structures with at least first and second antiparallel (AP) pinned layers and at least one antiparallel (AP) coupling layer with the AP coupling layer being located between the first and second AP pinned layers;
forming a free layer structure that has a magnetic moment that is oriented parallel to the head surface and parallel to major planes of the AP pinned layers;
forming a nonmagnetic electrically conductive first spacer layer between the first AP pinned layer structure and the free layer structure and a nonmagnetic electrically conductive second spacer layer between the second AP pinned layer structure and the free layer structure;
forming the first AP pinned layer of the first AP pinned layer structure interfacing the first spacer layer and the first AP pinned layer structure of the second AP pinned layer structure interfacing the second spacer layer;
forming each of the first and second AP pinned layers with a magnetic moment that is oriented perpendicular to the head surface;
forming the magnetic moments of the first AP pinned layers of the first and second AP pinned layer structures parallel with respect to one another and in a same direction, the magnetic moments of second AP pinned layers of the first and second AP pinned layer structures parallel with respect to one another and in a same direction and the magnetic moments of the first AP pinned layers antiparallel to the magnetic moments of the second AP pinned layers; and
each of the first AP pinned layers of the first and second AP pinned layer structures being formed with a magnetic thickness that is greater than a magnetic thickness of each of the second AP pinned layers of the first and second AP pinned layer structures.

6. A method of making a magnetic head assembly, that has a head surface for facing a magnetic medium, comprising the steps of:

forming ferromagnetic first and second shield layers with nonmagnetic and insulative first and second read gap layers located between the first and second shield layers;

forming a spin valve sensor between the first and second read gap layers;

a method of making the spin valve sensor including the steps of:

forming first and second antiparallel (AP) pinned layer structures wherein each AP pinned layer structure is self pinned without the assistance of a pinning layer;

forming each of the first and second AP pinned layer structures with at least first and second antiparallel (AP) pinned layers and at least one antiparallel (AP) coupling layer with the AP coupling layer being located between the first and second AP pinned layers;

forming a free layer structure that has a magnetic moment that is oriented parallel to the head surface and parallel to major planes of the AP pinned layers;

forming a nonmagnetic electrically conductive first spacer layer between the first AP pinned layer structure and the free layer structure and a nonmagnetic electrically conductive second spacer layer between the second AP pinned layer structure and the free layer structure;

forming the first AP pinned layer of the first AP pinned layer structure interfacing the first spacer layer and the first AP pinned layer structure of the second AP pinned layer structure interfacing the second spacer layer;

forming each of the first and second AP pinned layers with a magnetic moment that is oriented perpendicular to the head surface;

forming the magnetic moments of the first AP pinned layers of the first and second AP pinned layer structures parallel with respect to one another and in a same direction, the magnetic moments of second AP pinned layers of the first and second AP pinned layer structures parallel with respect to one another and in a same direction and the magnetic moments of the first AP pinned layers antiparallel to the magnetic moments of the second AP pinned layers;

each of the first AP pinned layers of the first and second AP pinned layer structures being formed with a magnetic thickness that is greater than a magnetic thickness of each of the second AP pinned layers of the first and second AP pinned layer structures;

a method of making a write head comprising the steps of forming ferromagnetic first and second pole piece layers which each have a yoke portion located between a pole tip portion and a back gap portion;

forming a nonmagnetic write gap layer located between the pole tip portions of the first and second pole piece layers;

forming an insulation stack with at least one coil layer embedded therein between the yoke portions of the first and second pole piece layers; and connecting the first and second pole piece layers at their back gap portions.

7. A method of making a magnetic head assembly, that has a head surface for facing a magnetic medium, comprising the steps of:

forming ferromagnetic first and second shield layers with nonmagnetic and insulative first and second read gap layers located between the first and second shield layers;

forming a spin valve sensor between the first and second read gap layers;

a method of making the spin valve sensor including the steps of:

forming first and second antiparallel (AP) pinned layer structures wherein each AP pinned layer structure is self pinned without the assistance of a pinning layer;

forming each of the first and second AP pinned layer structures with at least first and second antiparallel (AP) pinned layers and at least one antiparallel (AP) coupling layer with the AP coupling layer being located between the first and second AP pinned layers;

forming a free layer structure that has a magnetic moment that is oriented parallel to the head surface and parallel to major planes of the AP pinned layers;

forming a nonmagnetic electrically conductive first spacer layer between the first AP pinned layer structure and the free layer structure and a nonmagnetic electrically conductive second spacer layer between the second AP pinned layer structure and the free layer structure;

forming the first AP pinned layer of the first AP pinned layer structure interfacing the first spacer layer and the first AP pinned layer structure of the second AP pinned layer structure interfacing the second spacer layer;

forming each of the first and second AP pinned layers with a magnetic moment that is oriented perpendicular to the head surface;

forming the magnetic moments of the first AP pinned layers of the first and second AP pinned layer structures parallel with respect to one another and in a same direction, the magnetic moments of second AP pinned layers of the first and second AP pinned layer structures parallel with respect to one another and in a same direction and the magnetic moments of the first AP pinned layers antiparallel to the magnetic moments of the second AP pinned layers;

said forming of the AP pinned layers includes applying a first magnetic field that is oriented perpendicular to the head surface;

applying a second magnetic field after applying said first magnetic field for orienting the magnetic moments of the AP pinned layers perpendicular to the head surface in desired directions;

forming first and second hard bias layers abutting first and second side edges of the free layer structure;

longitudinally setting the dual spin valve sensor by applying a third magnetic field that is oriented parallel to the head surface and parallel to the major planes of the AP pinned layers for oriented magnetic moments of the hard bias layers parallel to the head surface and parallel to the major planes of the AP pinned layers;

each of the first AP pinned layers of the first and second AP pinned layer structures being formed with a magnetic thickness that is greater than a magnetic thickness of each of the second AP pinned layers of the first and second AP pinned layer structures;

the magnetic head assembly further including a write head, the method of making the write head comprising the steps of:

forming ferromagnetic first and second pole piece layers which each have a yoke portion located between a pole tip portion and a back gap portion;

forming a nonmagnetic write gap layer located between the pole tip portions of the first and second pole piece layers;

forming an insulation stack with at least one coil layer embedded therein between the yoke portions of the first and second pole piece layers; and connecting the first and second pole piece layers at their back gap portions.

8. A method of making a magnetic head assembly, that has a head surface for facing a magnetic medium, comprising the steps of:

a method of making a spin valve sensor including the steps of:

forming first and second antiparallel (AP) pinned layer structures wherein each AP pinned layer structure is self pinned without the assistance of a pinning layer;

forming each of the first and second AP pinned layer structures with at least first and second antiparallel (AP) pinned layers and at least one antiparallel (AP) coupling layer with the AP coupling layer being located between the first and second AP pinned layers;

forming a free layer structure that has a magnetic moment that is oriented parallel to the head surface and parallel to major planes of the AP pinned layers;

forming a nonmagnetic electrically conductive first spacer layer between the first AP pinned layer structure and the free layer structure and a nonmagnetic electrically conductive second spacer layer between the second AP pinned layer structure and the free layer structure;

forming the first AP pinned layer of the first AP pinned layer structure interfacing the first spacer layer and the first AP pinned layer structure of the second AP pinned layer structure interfacing the second spacer layer;

forming each of the first and second AP pinned layers with a magnetic moment that is oriented perpendicular to the head surface;

forming the magnetic moments of the first AP pinned layers of the first and second AP pinned layer structures parallel with respect to one another and in a same direction, the magnetic moments of second AP pinned layers of the first and second AP pinned layer structures parallel with respect to one another and in a same direction and the magnetic moments of the first AP pinned layers antiparallel to the magnetic moments of the second AP pinned layers;

each of the first AP pinned layers being formed with a magnetic thickness that is greater or less than a magnetic thickness of each of the second AP pinned layers of the first and second AP pinned layer structures;

said forming of the AP pinned layers includes applying a first magnetic field that is oriented perpendicular to the head surface and then applying a second magnetic field after applying said first magnetic field for orienting the magnetic moments of the AP pinned layers perpendicular to the head surface in desired directions.

* * * * *